United States Patent [19]

Saegusa

[11] Patent Number: 4,758,854
[45] Date of Patent: Jul. 19, 1988

[54] CAMERA SYSTEM

[75] Inventor: Takashi Saegusa, Kawasaki, Japan

[73] Assignee: Nippon Kogaku K.K., Tokyo, Japan

[21] Appl. No.: 7,791

[22] Filed: Jan. 28, 1987

[30] Foreign Application Priority Data

Feb. 1, 1986 [JP] Japan .................................. 61-19198
Mar. 31, 1986 [JP] Japan .................................. 61-73913

[51] Int. Cl.$^4$ .............................................. G03B 17/00
[52] U.S. Cl. .................................................. 354/286
[58] Field of Search .............................. 354/286, 455

[56] References Cited

U.S. PATENT DOCUMENTS 4,572,638 2/1986 Nakai et al. ......................... 354/286

Primary Examiner—Michael L. Gellner
Attorney, Agent, or Firm—Shapiro and Shapiro

[57] ABSTRACT

A camera system has electrical contacts consisting of a first terminal for initiating data exchange between an interchangeable lens and a camera body, a second terminal for a common clock signal, a third terminal for common exchange of serial data, and a fourth terminal for initiating data exchange between the camera body and an intermediate accessory. The electrical contacts are used for data exchange between the camera body and the interchangeable lens or the intermediate accessory.

4 Claims, 6 Drawing Sheets

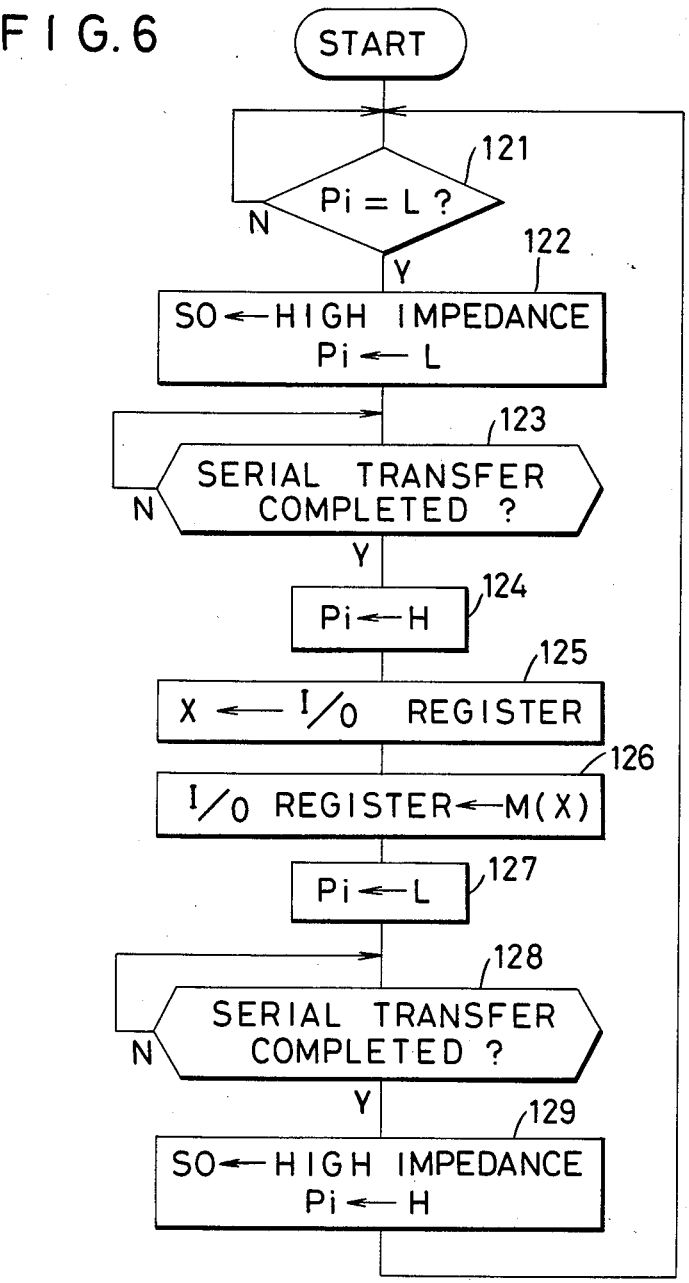

CAMERA SYSTEM

BACKGROUND OF THE INVENTION

1. Field of the Invention

The present invention relates to a camera system in which data are exchanged through electrical contacts between a camera body and an interchangeable lens or an intermediate accessory.

2. Related Background Art

There are already proposed various systems for transmitting serial data, for enabling a camera body such as of a single lens reflex camera to receive various information from a lens. For example the U.S. Pat. No. 4,572,638 discloses a system including an intermediate accessory such as a teleconversion lens to be inserted between a camera body and an interchangeable lens, wherein said system contains a terminal for initiating data transmission to the camera body, a clock pulse terminal and a data transmitting terminal. In case said intermediate accessory is employed, the lens data are transmitted to the camera body through an operation circuit of the intermediate accessory. Such system with intermediate accessory not only requires time for the camera body to receive the data but also complicates the structure of said intermediate accessory.

SUMMARY OF THE INVENTION

An object of the present invention is to provide a camera system allowing data exchange among an intermediate accessory, an interchangeable lens and a camera body with a simple structure.

Another object of the present invention is to provide a camera system capable of easily calculating data on a synthesized focal length of an interchangeable lens and an intermediate accessory and on a synthesized lens aperture thereof.

The foregoing objects can be achieved, according to the present invention, through the use of electrical contacts for data exchange between the camera body and an interchangeable lens or an intermediate accessory, consisting of a first terminal for initiating data exchange between the interchangeable lens and the camera body, a second terminal for a common clock signal, a third terminal for common exchange of serial data, and a fourth terminal for initiating data exchange between the camera body and the intermediate accessory.

BRIEF DESCRIPTION OF THE DRAWINGS

FIG. 6 is a flow chart of a process common to MCU's 20, 30 and 40.

DETAILED DESCRIPTION OF THE PREFERRED EMBODIMENTS

Figure 1:
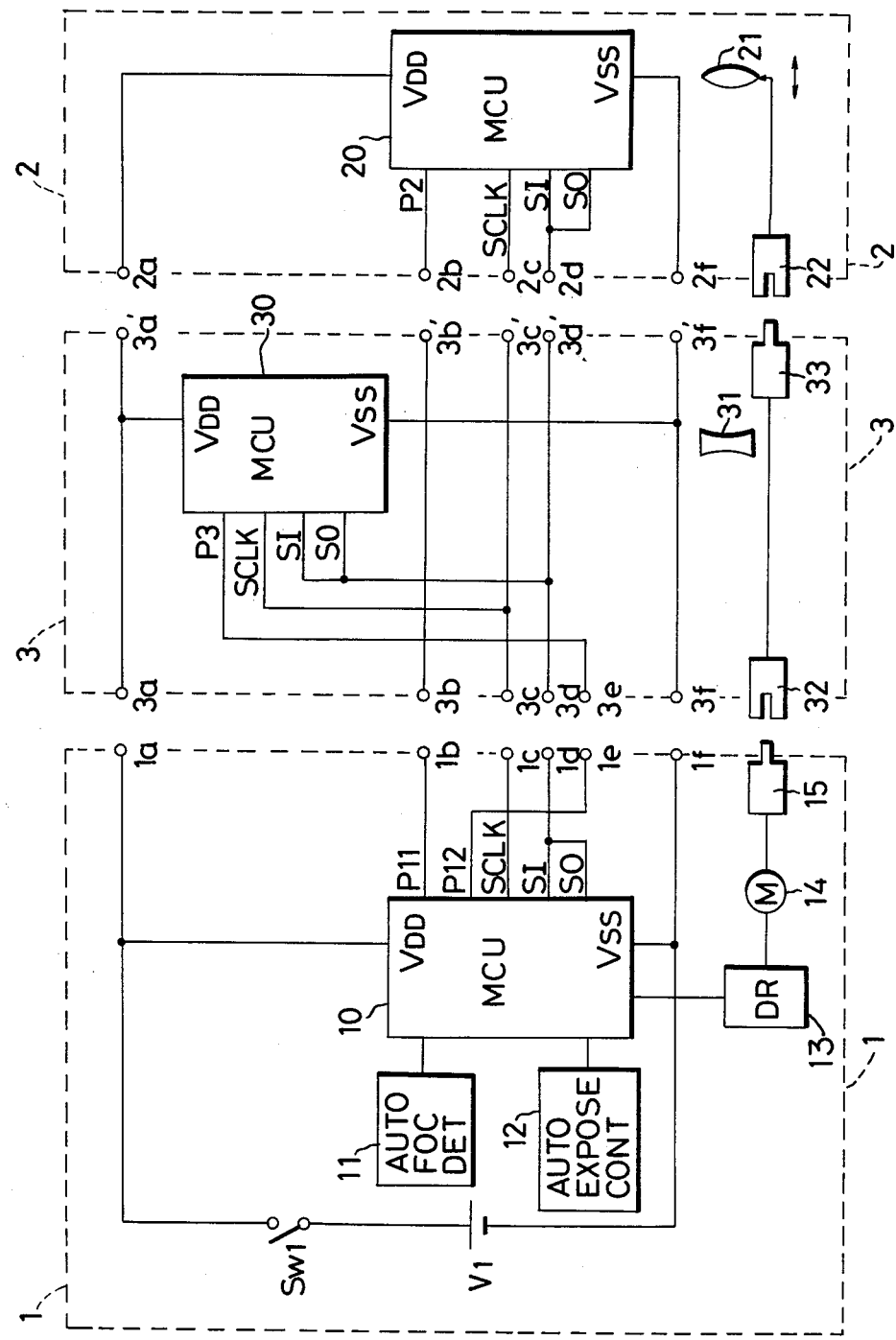
FIG. 1 is a block diagram of an embodiment of the present invention.

FIG. 1 is a block diagram of an embodiment of the present invention, wherein shown are a camera body 1, an interchangeable lens 2 with automatic focusing capability, and an intermediate accessory 3 without automatic focusing capability in itself. The camera body 1, capable of automatic exposure control and automatic focusing control, is provided with a microcomputer (MCU) 10, a focus delecting unit 11, an automatic exposure control unit 12, a motor driver 13, a motor 14 and a coupler 15, and can exchange data with the interchangeable lens 2 or the intermediate accessory through electrical contacts 1a-1f. A power switch SW1 is closed for example by a half depression of a shutter release button, and supplies electric power from a power source V1 in the camera to all the circuits in the camera body 1 and also to the interchangeable lens 2 and the intermediate accessory 3 through a power supply terminal 1a. The exposure control unit 12 executes a known exposure control process under the control of the MCU 10, while the MCU 10 determines the driving direction of the motor 14 according to the output of the focus detecting unit 12, and controls the rotation of the coupler 15 by supplying a drive signal to the driver 13. Said coupler 15 engages with a coupler of the lens or the intermediate accessory, such as a teleconversion lens, and achieves automatic focusing operation by displacing optical systems. The MCU 10 is composed of a microcomputer provided with a known serial interface of which a serial clock port SCLK is connected to an electrical contact 1c, while a serial output port SO and a serial input port SI are mutually connected and further connected to an electrical contact 1d. An input/output port P11 is connected to an electrical contact 1b, while an input/output port P12 is connected to an electrical contact 1e, and an electrical contact 1f constitutes a ground contact.

The interchangeable image-taking lens 2 is composed of an MCU 20, an optical system 21 and a coupler 22. Said coupler 22 engages with the coupler 15 of the camera body 1 or a coupler 33 of an intermediate accessory 3 for displacing the optical system 21. The MCU 20 is provided with a serial interface same as that of the MCU 10, wherein a serial clock port SCLK is connected to an electrical contact 2c, while a serial input port SI and a serial output port SO are mutually connected and further connected to an electrical contact 2d, and an input/output port P2 is connected to an electrical contact 2b. An electrical contact 2a serving as a power supply terminal supplies the power supply voltage V1 of the camera to the MCU 20, and an electrical contact 2f serves as a ground terminal.

The intermediate accessory 3 is composed of an MCU 30, an optical system 31, a coupler 32 and another coupler 33. The optical system 31 functions to extend the focal length of the interchangeable lens 2 if the intermediate accessory 3 is a teleconversion lens, but does not exist if said accessory is an intermediate ring for merely extending the optical path length. The coupler 32 is linked with the coupler 33 so that the mechanical rotation of the coupler 15 of the camera body 1 is transmitted to the coupler 22 of the lens 2, through engagements of the coupler 32 with the coupler 15 and of the coupler 33 with the coupler 22. The MCU 30 is equivalent to the MCU 20 and is provided with a serial interface the same as that of the MCU 10, wherein a serial clock port SCLK is connected to an electrical contact 3c, a serial input port SI and a serial output port SO are mutually connected and further connected to an electrical contact 3d, and an input/output port P3 is connected to an electrical contact 3e. An electrical contact 3a, serving as a power supply terminal, supplies electric power to the MCU 30 when connected to the power supply terminal 1a of the camera 1, and is connected further to an electrical contact 3a' for transmitting the power to the interchangeable lens 2 through the electrical contact 2a. An electrical contact 3b is not connected to the MCU 30 but is directly connected to an electrical contact 3b' for transmitting the output of the port P11 of the MCU 10 through the electrical contact 2b. Electrical contacts 3c, 3d are respectively connected to contacts 3c', 3d'' whereby the electrical contacts 2c, 2d are connected to the camera body 1. Electrical contacts 3f, 3f' are mutually connected whereby the grounds of the camera body 1 and the interchangeable lens 2 are commonly connected.

Figure 2:
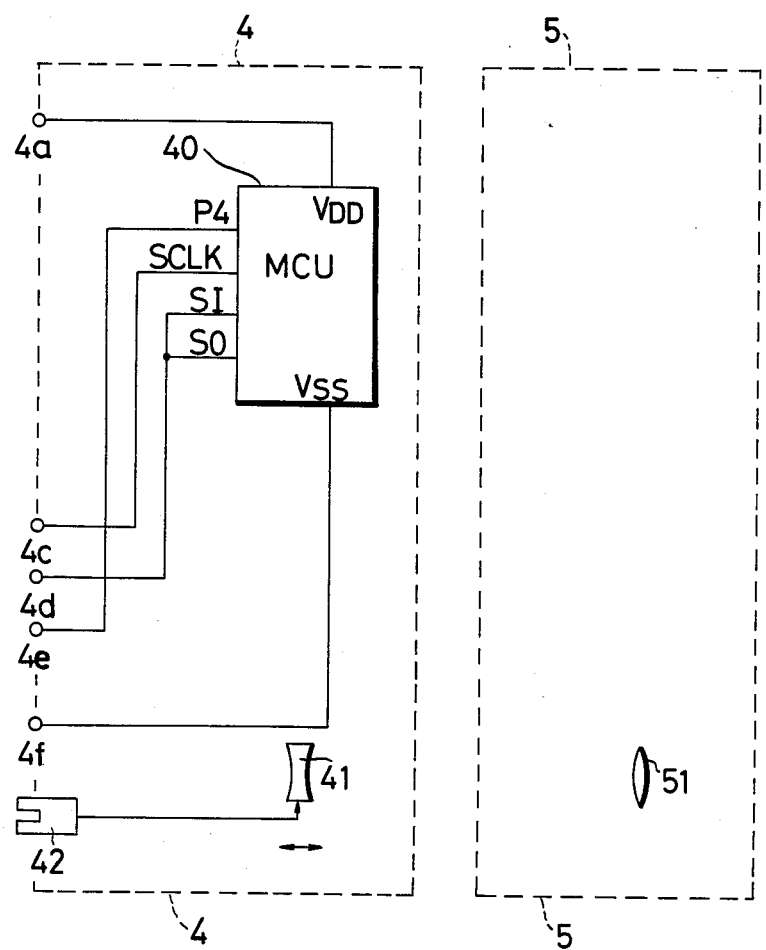
FIG. 2 is a block diagram of another accessory.

FIG. 2 is a block diagram of another intermediate accessory to be mounted on the camera 1, wherein an intermediate accessory 4, which is a teleconversion lens capable of automatic focusing, and an interchangeable lens 5 incapable of automatic focusing are both used in combination with the camera body 1 shown in FIG. 1. The intermediate accessory 4 is composed of an MCU 40, an optical system 41 and a coupler 42. The optical system 41 performs a function similar to that of the optical system 31 shown in FIG. 1. The coupler 42 engages with the coupler 15 of the camera body 1 and serves to displace the optical system 41 by rotation. The MCU 40 is basically the same as the MCU 30. However the intermediate accessory 4 is different from that 3 shown in FIG. 1 in that it lacks the contacts, 3a'-3f' shown in FIG. 1, for transmitting the electrical signals from the camera body to the interchangeable lens, and the coupler 33 shown in FIG. 1 for transmitting the mechanical rotation.

The interchangeable lens 5 is a conventional lens not equipped with a member for engaging with the coupler 15 of the camera body 1, being therefore incapable of automatic focusing. It is mainly composed of an optical system 51, which is manually moved for focusing with a conventional focusing ring.

In the above-explained structure, the interchangeable lens 2 or 5 can either be directly mounted on the camera body 1 or indirectly with the intermediate accessory 3 or 4 positioned therebetween.

The electrical contacts 1a-1f, 2a-2d, 2f, 3a-3f, 3a'-3d', 3f', 4a and 4c-4f are arranged along the periphery of lens mounts in such a manner that contacts of a same suffix face each other and are mutually connected electrically when the intermediate accessory 3, 4 or the lens 2 is mounted on the camera body 1 or the accessory 3.

In case the intermediate accessory 4 is inserted between the interchangeable lens 2 and the camera body 1, the electrical signals of the camera body 1 and the rotation of the coupler 15 cannot be transmitted to the lens 2, so that the lens 2 in this case can only perform functions same as those of the interchangeable lens 5.

Figure 3:
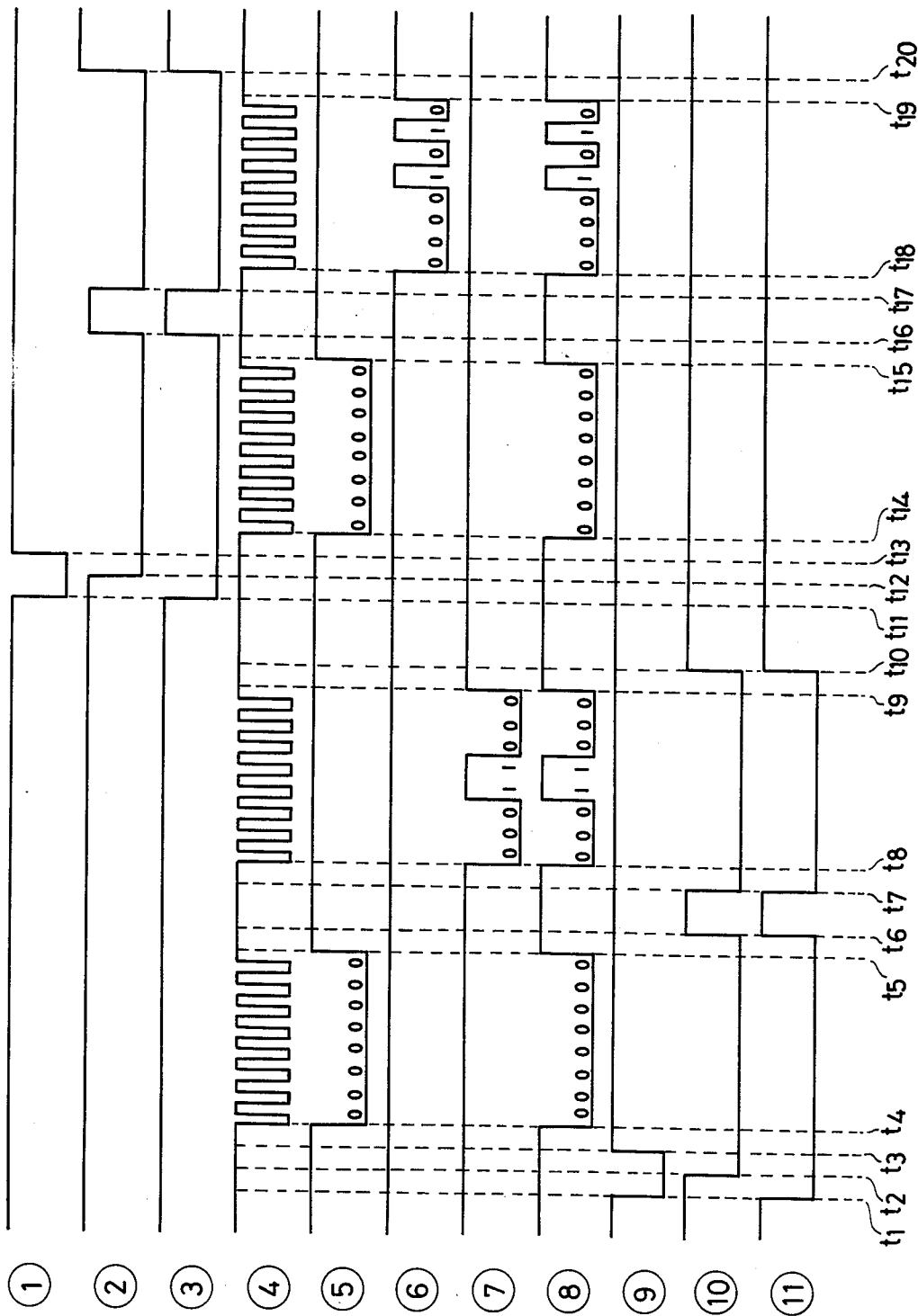
FIG. 3 is a timing chart showing serial data exchange in said embodiment.

FIG. 3 is a timing chart showing the function of the embodiment shown in FIG. 1, wherein the high level state and low level state are respectively represented by "1" and "0". Curves (1) and (2) respectively indicate the output signals of the input/output ports P11, P2 of the MCU's 10 and 20. Each port has an open drain structure with a pull-up resistor in the output state. Thus, when said ports are mutually connected through the contacts 1b, 2b or 3b, 3b', said ports provide a low-level output signal if either port outputs a low-level output, thus giving a synthesized output represented by (3) which is received as an input signal when either of said ports is in the input state. A curve (4) indicates the output signal of the serial clock port SCLK of the MCU 10, which is supplied, through the contacts 1c, 2c, 3c and 3c' to the serial clock ports SCLK of the MCU's 20, 30 and serves as the serial clock signal therefor. Curves (5), (6) and (7) indicate the output signals of the serial output ports SO of the MCU's 10, 20 and 30 respectively. Each port SO has an open drain structure with a pull-up resistor. Therefore, said ports, when mutually connected through the contacts 1d, 2d, 3d and 3d' provide a synthesized output as represented by a curve (8). The output signals of said output ports are also respectively supplied, as serial input signals, to the serial input ports SI of the MCU's 10, 20 and 30. Curves (9) and (10) indicate the output signals of the input/output ports P12, P3 of the MCU's 10 and 30. When said ports are mutually connected through the contacts 1e and 3e, said ports provide a synthesized output signal (11), in a similar manner as the curve (3), which is received in the input state of the port P12 or P3.

Figure 4:
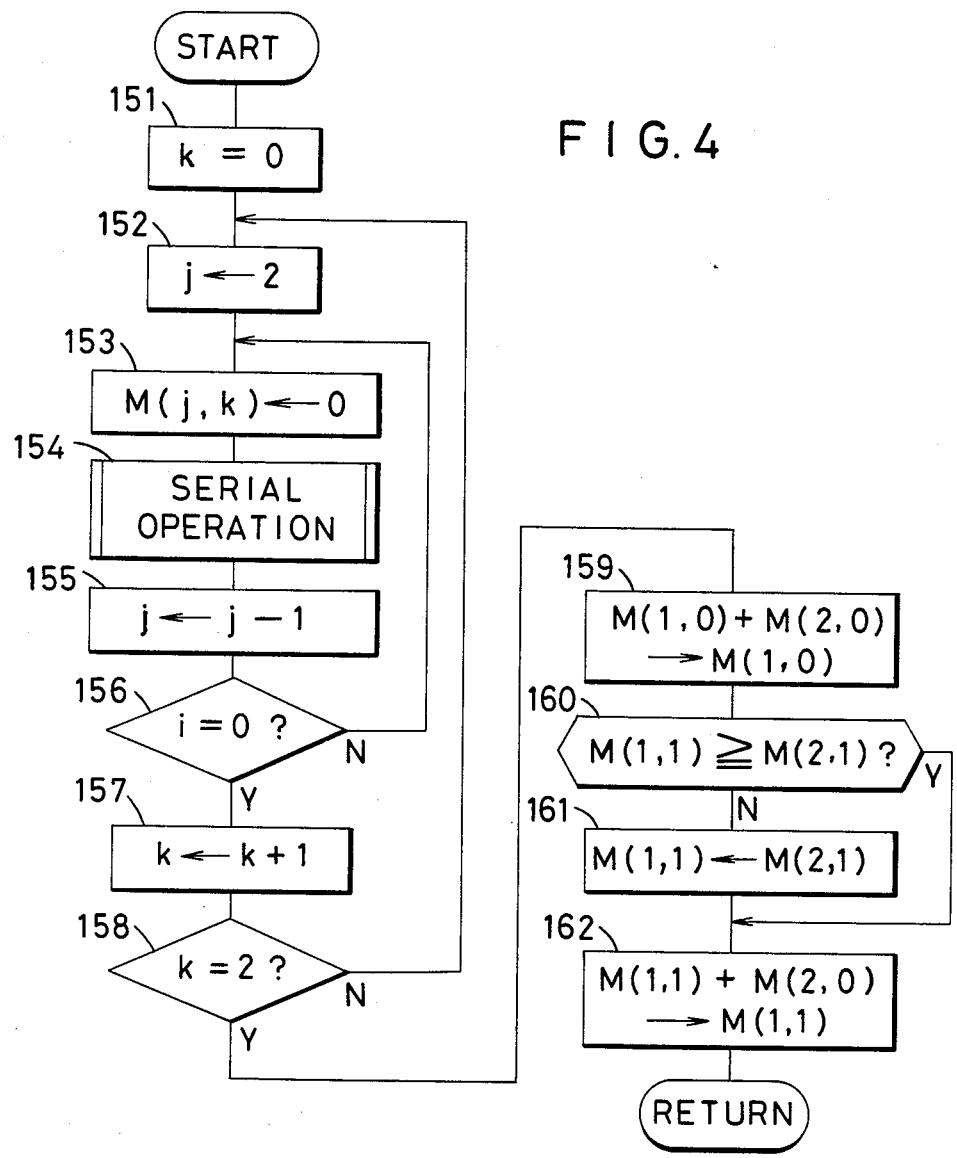
FIG. 4 is a flow chart of a subroutine of an MCU 10 for determining the synthesized focal length and the synthesized maximum aperture in the use of a teleconverter.

FIG. 4 is a flow chart showing a subroutine of the MCU 10 for determining the synthesized focal length and the synthesized maximum aperture when a teleconversion lens is mounted.

Figure 5:
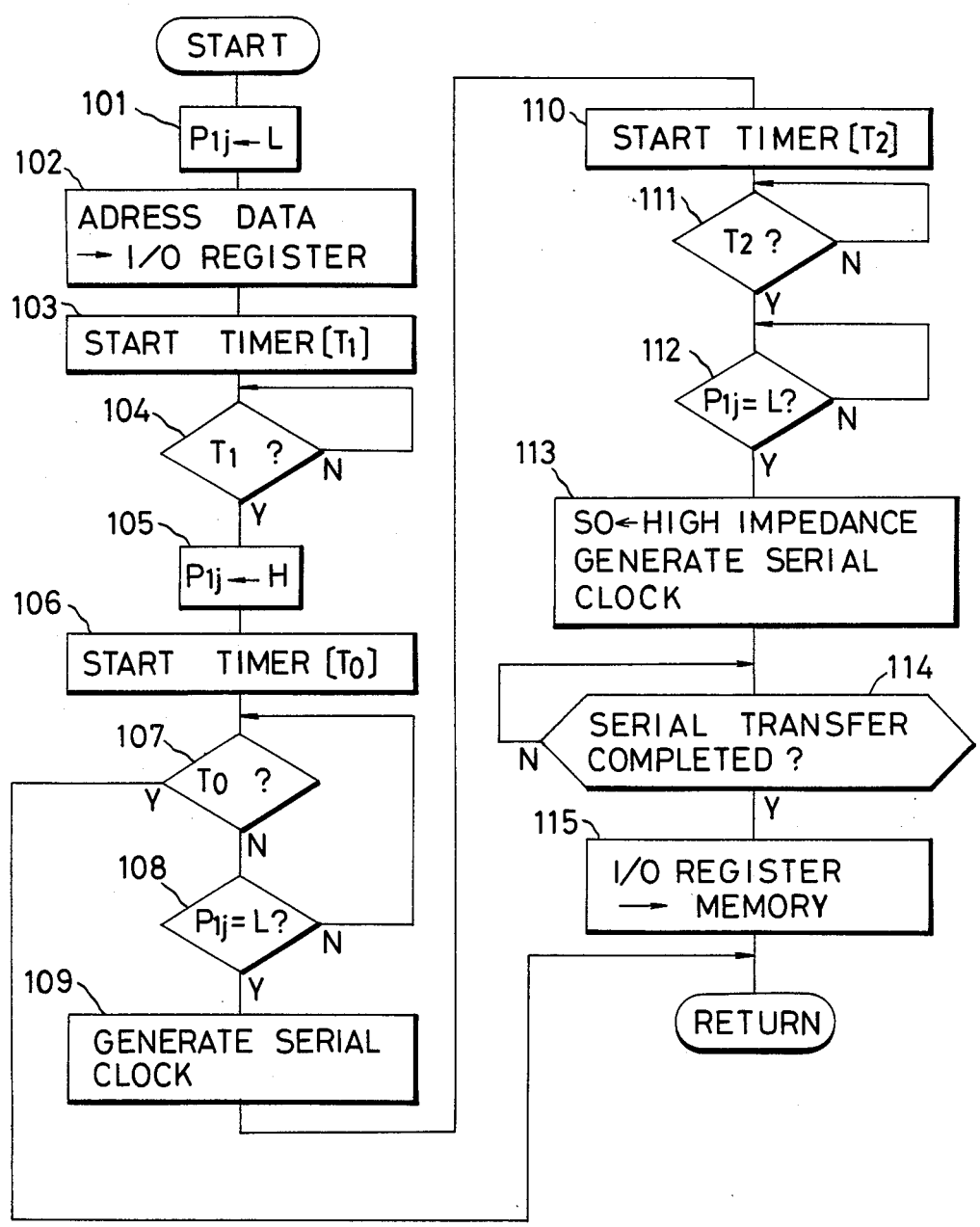
FIG. 5 is a flow chart of an input/output processing subroutine of the MCU 10 in a camera body 1.

FIG. 5 is a flow chart showing a subroutine of the MCU 10 for input/output process for the serial data. In this subroutine, an access to P11 or P12 is enabled by setting a variable j as 1 or 2 in advance. FIG. 6 is a flow chart of the MCU 20 or 30. The MCU 20 or 30 determines a variable i and is capable of outputting the data of the lens or intermediate accessory on which said MCU is mounted.

TABLE 1

| Hexadecimal data | Decimal data | Focal length |
| --- | --- | --- |
| $20 | 32 | 12.5 mm |
| $38 | 56 | 25 |
| $44 | 68 | 35 |
| $50 | 80 | 50 |
| $5C | 92 | 70 |
| $68 | 104 | 100 |
| $80 | 128 | 200 |
| $98 | 152 | 400 |
| $B0 | 176 | 800 |
| $D0 | 208 | 2000 |

Tab. 1 shows the data format of the focal length signal. Each interchangeable lens has hexadecimal data corresponding to the focal length thereof, according to Tab. 1. Said hexadecimal data, corresponding to the focal length of an interchangeable lens, are stored in the MCU 20 of said lens, or, more specifically, in an address $00 of the data area of the MCU 20. The decimal value x of said signal is obtained from the focal length f mm by the following equation:

$$x = 80 + 24 \cdot \log_2(f\,mm/50) \qquad (1)$$

Thus a standard 50 mm lens is represented by 80 ($50 in hexadecimal number), and an increase of focal length by 2 times, 4 times, ... is represented by an increase in the value by 24 ($18 in hexadecimal value), 48 ($30 in hexadecimal value), ... while a decrease in the focal length to a half is represented by a decrease by 24 ($18 in hexadecimal value). In this manner the value x varies logarithmically in response to a change in the focal length.

TABLE 2

| Hexadecimal data | Decimal data | Maximum aperture |
|---|---|---|
| $00 | 0 | F 1.0 |
| $0C | 12 | F 1.4 |
| $18 | 24 | F 2 |
| $24 | 36 | F 2.8 |
| $30 | 48 | F 4 |
| $3C | 60 | F 5.6 |
| $48 | 72 | F 8 |
| $54 | 84 | F11 |
| $60 | 96 | F16 |
| $6C | 108 | F22 |
| $78 | 120 | F32 |

Tab. 2 shows the data format of the maximum aperture signal. Each interchangeable lens has a hexadecimal value corresponding to the maximum aperture thereof, according to Tab. 2. Said hexadecimal value, corresponding to the maximum aperture of an interchangeable lens, is stored in the MCU 20 of said lens, or, more specifically, in an address $01 of the data area of the MCU 20. The decimal value x of said signal is obtained from the maximum aperture F by the following equation:

$$x = 24 \cdot \log_2 F \quad (2)$$

Said value x corresponds to the AV value in APEX calculation, and increases by 24 ($18 in hexadecimal value) when the maximum aperture F is doubled. Said increase is the same as that in case the focal length is doubled. In this manner the value x varies logarithmically in response to the change of the maximum aperture.

Besides the minimum aperture, the target aperture to be controlled and the number of aperture stops to be reduced are determined in a data format similar to that for said maximum aperture.

TABLE 3

| Hexadecimal data | Decimal data | Magnification of teleconverter $\beta$ |
|---|---|---|
| $00 | 0 | ×1 |
| $0C | 12 | ×1.4 |
| $18 | 24 | ×2 |
| $FF | — | other than teleconverter |

Tab. 3 shows a data format for the image magnification $\beta$ of the teleconverter. Each intermediate accessory stores a hexadecimal value corresponding to the teleconverter magnification of said accessory, according to Tab. 3. Said hexadecimal value, corresponding to the teleconverter magnification of an intermediate accessory is stored in the MCU 30 thereof, or, more specifically, in an address $00 of the data area of the MCU 30. The decimal value x of said signal is obtained from the magnification $\beta$ according to the following equation:

$$x = 24 \cdot \log_2 \beta \quad (3)$$

For example, in an intermediate accessory 3 consisting of a teleconversion lens of a magnification of 2 times, a value $18 is stored in an address $00 of the memory of the MCU 30. Said value x increases by 24 ($18 in hexadecimal value) when the image magnification is doubled, in the same manner as in the focal length or the maximum aperture. In this manner the value x varies logarithmically in response to a change in the image magnification.

A value $FF indicates that the intermediate accessory bearing said value is not a teleconversion lens.

TABLE 4

| Address | Data | Content |
|---|---|---|
| $00 | $50 | Focal length |
| $01 | $14 | Maximum aperture value |
| $02 | $00 | Spare |
| $03 | $58 | Maximum step number of aperture reduction |
| $04 | $80 | Lens type |
| $05 | $1B | Control variable (1) for auto focusing |
| $06 | $15 | Control variable (2) for auto focusing |
| $07 | $20 | Control variable (3) for auto focusing |
| $08 | $01 | Version signal |
| $09 | $01 | Lens identification signal |
| $0A | $00 | Spare |

Tab. 4 shows the content of a ROM provided in the MCU 20, showing an example of a 50 nm lens with F1.8. An address 0 of the ROM of the data area of the MCU 20 stores a value $50 indicating the focal length according to the equation (1). An address 1 stored a value $14, corresponding to a decimal number 20 obtained from the equation (2) for a maximum aperture of 1.8. An address 2 is for spare and stores a value $00. If the minimum aperture is F22 (more precisely F22.6) corresponding to x=108, the maximum number of steps for aperture reduction is 88 steps or $58 in hexadecimal value, which is stored in an address 3. An address 4 stores lens type information, i.e. whether the lens is driven by the coupler. In this case the rotation of the coupler can be transmitted from the camera body to the lens 2, and the uppermost bit (bit 7) of 8-bit data alone is changed to "1" to store a value $80. Addresses 5 to 7 store control variables for automatic focusing, for example values indicating the relationship between the amount of defocus and the amount of displacement of the optical system 21. An address 8 stores a version signal, indicating the version, or history of software revisions, of the MCU incorporated in the lens. Tab. 4 stores a version number $01 indicating a first lens software, but this number is changed in case the software is revised or another software for another lens is prepared. Thus the same version number is used for plural lenses covered by the same MCU software. This signal can be utilized for example for the production control of lenses. An address 9 stores an identification number specific to the lens. This signal is given in the order of production of lenses, and is changed when the optical system of the lens is changed. This signal can not only be utilized for the production control but also for specifying the lens, in case the lens lacks certain lens data required in a new camera body designed after said lens is produced. In such case, such lacking data can be incorporated in the camera body to obtain a complete set of information. Additional data, for example information on the aberrations of the optical system 21, may be stored in addresses following the address A, but such addition of information will not be explained further.

Tab. 5 shows the content of the ROM of the data area provided in the MCU 30, corresponding to a case in which the intermediate accessory 3 is a teleconversion lens for doubling the focal length of the lens. An address 0 stores the image magnification $\beta$, which is $18 in hexadecimal value for a teleconverter of 2 times, according to the equation (3) or Tab. 3. An address 1 stores a value indicating the limited maximum aperture.

This teleconversion lens cannot provide an aperture larger than F1.8 due to a shadowing phenomenon, even when combined with a lens having a larger aperture. Thus the stored value is $14 in hexadecimal number, corresponding to a decimal number 20 determined from the equation (2).

TABLE 5

| Address | Data | Content |
| --- | --- | --- |
| $00 | $18 | Image magnification β |
| $01 | $14 | Limited maximum aperture |
| $02 | $00 | Spare |
| $03 | $00 | Spare |
| $04 | $E0 | Accessory type |
| $05 | $10 | Conversion factor (1) for auto focusing |
| $06 | $12 | Conversion factor (2) for auto focusing |
| $07 | $14 | Conversion factor (3) for auto focusing |
| $08 | $02 | Version number |
| $09 | $01 | Converter identification signal |
| $0A | $00 | Spare |

Addresses 2 and 3 are spare and store data $00. An address 4 stores the information on the type of accessory, i.e. whether said accessory can be driven by the coupler. The uppermost bit 7 of 8-bit data is "1" indicating that the rotation of the coupler of the camera body can be transmitted to the intermediate accessory in this case. Also bit 6 is "1", indicating S the presence of contacts $3a'$, $3b'$-$3d'$ and $3f'$ connectable with the contacts on the lens. Also bit 5 is "1", indicating that the rotation for moving the optical system 21 of the lens 2 can be transmitted by the couplers 32, 33. Consequently a value $E0 is stored in the address 4. Addresses 5-7 store conversion factors for automatic focusing, for example coefficients for correcting the aforementioned variables for automatic focusing in case an accessory is mounted. The MCU 10 executes a predetermined calculation according to the control variables and the conversion factors for automatic focusing stored in the addresses 5-7 of the lens 2 and of the accessory 3, thereby determining the control variables in case the accessory is combined with the lens, and achieving desired automatic focusing. An address 8 stores the version signal in the same manner as in Tab. 4. In the present example a value $2 is stored because of the difference between the MCU 20 and the MCU 30. Address 9 stores the identification number specific to the converter. It has the same intention as that of the lens identification number and may therefore be selected the same. However, in the present example, a value $01 is stored as shown in Tab. 5 since the lens and the converter have different contacts for access and can therefore be distinguished from each other. A value $02 will be assigned to a next model of the converter.

Additional data may be stored in an address following the address A, in a similar manner as in the case of the lens, but such additional data storage will not be explained further.

The content of the ROM provided in the MCU 40 is the same as that of the ROM in the MCU 30, except for the content of the address $04.

In the following there will be explained the function of the foregoing embodiment, while making reference to FIG. 3. The MCU 10 of the camera body, in the course of executing a main routine, enters a sub-routine shown in FIG. 4 when the synthesized focal length and the synthesized maximum aperture, including a teleconversion lens, are required.

In the RAM area of the MCU 10, data are allotted to each memory address M(j, k) corresponding to Tabs. 4 and 5.

TABLE 6

| M(j, k) | j = 1 (lens) | j = 2 (teleconversion lens) |
| --- | --- | --- |
| k = 0 | Focal length | Image magnification |
| k = 1 | Maximum aperture | Limited maximum aperture |
| k = 2 | Spare | Spare |
| k = 3 | Maximum number of steps of aperture reduction | Spare |
| k = 4 | Lens type | Accessory type |
| k = 5 | Control variable (1) for auto focusing | Conversion factor (1) for auto focusing |

At first, in a step 151, the MCU 10 sets "0" in a register of the MCU 10 for handling address data k, then a step 152 sets j=2 for instructing data exchange with the intermediate accessory, and a step 153 clears the memory M(j, k). Since said register is set at j=2 and k=0 in this state, a memory area for the image magnification β shown in Tab. 6 is cleared. Then a step 154 calls a subroutine for the serial input/output process (serial operation) and the program enters a sub-routine shown in FIG. 5.

In a step 101 shown in FIG. 5, the MCU 10 sets the input/output port P1j, or P12, to the output state, whereby the port P12 outputs a low-level output to initiate the exchange of serial data shown in FIG. 3. The P1j is designated as P12 until modified later. Then, at t=t1, the output of the port P12 varies from the high-level state to the low-level state as shown by the curve (9). After resetting at the start of power supply or after a step 129 to be explained later, the MCU 30 enters a state of a step 121 to be explained later to set the input/output port P3 (Pi=3 in case of the MCU 30) at the input state and monitors whether the input to P3 is at the low-level state. If at the high-level state the step 121 is repeated, or, if at the low-level state, the program proceeds to a step 122. Since the input/output port P3 of the MCU 30 observes the signal (11) synthesized with the output of the port P12, the program can proceed to the step 122 at t=t1. The step 122 shifts the port SO to a high impedance state for avoiding the influence on the input to the port SI, and shifts the input/output port P3 to the output state to output a low-level signal (t=t2) indicating a stand-by state. After the execution of the step 101, the MCU 10 proceeds to a step 102 for transferring the address data stored in the memory of the MCU 10 to a serial input/output register (hereinafter called I/0 register), then measures a predetermined period T1 with an internal timer [T1] in steps 103 and 104, and shifts the input/output port P12 to the high-level state (t =t3) after a low-level response from the MCU 30, i.e. after the expiration of said predetermined period T1. A step 106 activates an internal timer [T0], and a step 107 discriminates whether the time T0 of said internal timer has expired. Said steps 106 and 107 are provided in consideration of a case in which the lens 2 is directly mounted on the camera body 1. In such case the port P12 continuously remains at the high-level state, so that the MCU 10 does not proceed to a sequence starting from a step 108. In the step 108, the MCU 10 sets the input/output port P12 at the input state, and monitors whether the port P12 is at the low-level state. The step 108 is repeated if the port P12 (synthesized output (11)) is at the high-level state, but, if it is at the low-level state, the program proceeds to a step 109 for generating serial clock pulses (t=t4). In this state the aforementioned memory of the MCU 10 stores a value $00 as address data set in the step 151 shown in FIG. 4. Thus, after t =t4, the serial output port SO of the MCU 10 outputs the address data as "00000000" starting from the least significant bit (LSB) as shown by the curve (5), in synchronization with the serial clock pulses of the MCU 10 shown by the curve (4). During said output, the MCU 30 monitors, in a step 123, a flag which is shifted to "1" upon entry of 8 serial clock pulses to the port SCLK, and repeats the step 123 while the flag is "0" indicating an uncompleted serial transfer. In response to the entry of 8 pulses at t =t5, the program proceeds to a step 124 to shift the port P3 and the input/output port P12 to the high-level state (t=t6). Then a step 125 transfers the data of the serial input/output register of the MCU 30 to an X-register thereof. Said data, stored in the serial input/output register, are those from the port SO of the MCU 10 during a period from t4 to t5. Since the ports SO of the MCU's 20 and 30 are maintained at the high impedance state during said period, there is obtained a synthesized output shown by the curve (8), whereby the port SI of the MCU 30 receives data "00000000". starting from the least significant bit, or "00000000B" starting from the most significant bit, wherein "B" indicates a binary number. In this manner the address data $00, indicating the image magnification in Tab. 5, are transferred to the X-register of the MCU 30. Then a step 126 transfers the data M(x) of the address $00 of the MCU 30, designated by the X-register, to the serial input/output register of the MCU 30. Since the MCU 30 already stores the data shown in Tab. 5, there are therefore obtained data $18. then a step 127 a low-level signal from the input/output port P3, in order to indicate that the preparation for transfer is completed (t=t7). After the step 109, the MCU 10 causes, in steps 110 and 111, an internal timer [T2] to measure a predetermined period T2, and, when the input/output port P3 is shifted to the high-level state after t =t6, monitors in a step 112 whether the input/output port P12 is at the low-level state. If said port P12 is at the high-level state, the above-explained process is repeated. When the output of the port P2 of the MCU 30 (curve (10)) is shifted from the high-level state to the low-level state, the port P12 of the MCU 10 receives the signal of the curve (11) so that the MCU 10 can proceed to a next step. A step 113 sets the serial output port SO of the MCU 10 at the high impedance state, and causes the port SCLK to release the serial clock pulses (curve (4), t=t8). Then, in synchronization with the serial clock pulses, the port SO of the MCU 30 releases data $18, or data "00011000B" in binary representation, stored in the serial input/output register of the MCU 30 in the step 126, bit by bit from the least significant bit. Said data are entered, in the form of the curve (8), into the serial input port SI of the MCU 10, and also entered, bit by bit in synchronization with the serial clock pulses and starting from the least significant bit, into the serial input/output register of the MCU 10. In a step 114, the MCU 10 monitors the completion of said serial transfer by means of a flag which is shifted to "1" in response to the entry of 8 serial clock pulses, in the same manner as in the step 123 of the MCU 30. The transfer of data $18 or "00011000B " to the input/output register of the MCU 10 is completed when the flag assumes a value "1" at t=t9, and the program proceeds to a step 115 to store the data of said serial input/output register in the memory M(j, k), which is M(2, 0) in this case, of the MCU 10. In this manner the MCU 10 completes the input/output subroutine of the serial data for the intermediate accessory 3, in which data $18 have been received for the image magnification Δ. After the step 127, the MCU 30 executes a step 128 for monitoring the completion of serial transfer in a similar manner as in the step 123, then, upon completion of the serial transfer, proceeds to a step 129 to set the serial output port SO at the high impedance state thereby avoiding the influence on other accessories in the serial data exchange between the camera body and the lens, then shifts the input/output port P3 to the high level state (t=t10), and the program returns to the step 121. Thereafter the input/output port P3 is shifted to the input state, and there is monitored the start of the serial data exchange initiated by the low-level state of the synthesized output (11) obtained by the output of the port P12 of the MCU 10. Since the serial output port SO and the input/output port P3 are in the high impedance state or the high-level state, the serial data transmission between the camera body and the lens does not affect the intermediate accessory when it is inserted between said camera body and lens.

Different from MCU 30, the MCU 20 in a period from t=t1 to t10 repeatedly monitors the input/output port P2 in a step 121 because the serial data transmission is not initiated by the input/output port P11 of the MCU 10 and reaches a stand-by state, but the data transmission between the camera body and the intermediate accessory is not affected since the serial output port SO of the MCU 20 is in the high impedance state. After completing the sub-routine shown in FIG. 5, the MCU 10 returns to the flow chart shown in FIG. 4 and executes a step 155 for reducing the value of j by one, and a step 156 for discriminating whether the obtained result is zero. Since the value of j is shifted from 2 to 1 in the present example, the program jumps to a step 153 for clearing the memory M(1, 0) storing the focal length signal, and the program again enters, through a step 154, the serial data input/output subroutine shown in FIG. 5. In said subroutine the input-output port P11 is designated this time, thereby starting the serial data transmission of the port P2 of the MCU 20 connected through the contacts 1b, 3b, 3b' and 2b (t=t11).

The sequence thereafter is basically the same as that for the intermediate accessory 3 except that the process of the MCU 10 is conducted on the port P11 instead of the port P12, and is responded by the MCU 20 of the interchangeable lens instead of the MCU 30. A sequence in a period of t11–t20 corresponds to that in a period of t1–t10. Though the details are not explained, in response to the address data $00 set in the step 151 and outputs from the MCU 10, the serial output port SO of the MCU 20 outputs data "00001010" starting from the least significant bit, in synchronization with the serial clock pulses of the curve (4), in a period t=t18–t19. Said data can be rewritten as 01010000B starting from the most significant bit or $50, and are stored in the memory M(1, 0) of the MCU 10.

When the subroutine shown in FIG. 5 is completed, the step 155 in FIG. 4 subtracts one from the value of j. Since the result is equal to zero in this case, the program proceeds to a step 157 for increasing the value of address data k by one. Then the program proceeds to a step 159 or 152, respectively if the obtained result is k=2 or not. Since the result is equal to k=1 in the present example, the program jumps to the step 152, which again sets j=2 for effecting data transfer with the intermediate accessory. The succeeding step 153 clears the memory M(2, 1), and the step 154 initiates the sub-routine shown in FIG. 5 for supplying address data $01 to the teleconverter. In response to the data "01000000", starting from the least significant bit (S01) from the port SO of the MCU 10 in a period of t4–t5, the port SO of the MCU 30 of the teleconverter releases data "00101000", starting from the least significant bit, ($14) indicating the limited maximum aperture in a period of t8–t9, and said data are stored in the memory M(2, 1) of the MCU 10. After the completion of said sub-routine, the step 155 varies the value of j from 2 to 1, whereby the program proceeds to the step 153. Since j=1 and k=1 in this state, the memory area M(1, 1)storing the maximum aperture value is cleared, and the step 154 again initiates the sub-routine shown in FIG. 5 to send the address data $01 to the interchangeable lens 2 and to receive the maximum aperture value $14 therefrom. The succeeding step 155 shifts the value of j from 1 to 0, whereby the program proceeds to the step 157 for adding one to the address data k. Since the obtained result is k=2 in this case, the program proceeds to a step 159.

In the above-explained procedure, the MCU 10 has acquired the focal length signal $50 received from the lens and stored in the memory M(1, 0), the maximum aperture signal S14 stored in the memory M(1, 1), the image magnification $\beta$=$18 received from the teleconverter and stored in the memory M(2, 0), and the limited maximum aperture $14 stored in the memory M(2, 1).

Then, in a step 159, the MCU 10 adds the data of the teleconverter stored in the M(2, 0) to the focal length data stored in the M(1, 0), whereupon a value indicating the synthesized focal length is obtained in the memory M(1, 0). More specifically there is conducted an addition:

$$\$50 + \$18 = \$68 \tag{4}$$

and the obtained result indicates a synthesized focal length of 100 mm according to Tab. 1.

The equation (4) can be rewritten, from the equations (1) and (3), as follows:

$$\{80 + 24 \cdot \log_2(f\,mm/50)\} + 24 \cdot \log_2\beta = \{80 + 24 \cdot \log_2((f\,mm \cdot \beta)/50)\} \tag{5}$$

No further calculation, for example for determining the value of f, is necessary since f and f·$\beta$ are correlated in the MCU of the camera body. It is therefore possible to obtain the synthesized focal length by merely adding the data of the memory M(1, 0) and that of the memory M(2, 0) in the MCU 10.

It is therefore rendered possible to automatically shift from so-called standard program mode, in which a 50 mm lens is mounted in the program exposure control mode, to so-called high-speed program mode when the teleconverter is mounted.

Then a step 160 compares the maximum aperture value stored in the memory M(1, 1) of the MCU 10 with the limited maximum aperture value stored in the memory M(2 1), and the program proceeds to a step 162 or a step 161 respectively if the value of the memory M(1, 1) is larger or smaller. The step 161 transfers the value of the limited maximum aperture stored in the memory M(2, 1) to the memory M(1, 1) storing the maximum aperture value.

In case the aperture of the lens is limited by the aperture of a teleconverter, the maximum aperture value is replaced by the limited maximum aperture value by the steps 160 and 161. However, in the present example in which the lens and teleconverter respectively have a maximum aperture value and a limited maximum aperture value both equal to $14, as shown in Tabs. 4 and 5, such replacement is not required and the program jumps from the step 160 to a step 162. Said step 162 adds the maximum aperture value stored in the memory M(1, 1) and the image magnification $\beta$ stored in the memory M(2, 0) and stores the result in the memory M(1, 1). In the present example there is conducted a calculation:

$$\$14 + \$18 = \$2C \tag{6}$$

to obtain a synthesized maximum aperture value $2C in the memory M(1, 1). Also in this case the synthesized aperture value can be obtained by a simple addition of the data of the memories M(1, 1) and M(2, 0) in the MCU 10. As for the memory M(2, 0), there can be employed a value same as in the step 159, because the changes of the focal length, maximum aperture and image magnification of the teleconverter are assumed to be equal to 24 (or $18 in hexadecimal presentation).

The equation (6) can be rewritten, from the equations (2) and (3), as follows:

$$24\cdot\log_2 F + 24\cdot\log_2\beta = 24\cdot\log_2(F\cdot\beta) \tag{7}$$

Thus the synthesized maximum aperture F×8 can be represented as:

$$F\cdot\beta = 2^{x'/24} \tag{8}$$

wherein x' is the synthesized data. Thus the following result can be obtained from x=44 corresponding to $2C in the equation (6):

$$F\cdot\beta = 2^{44/24} = 3.56 \tag{9}$$

In this manner the synthesized maximum aperture is equal to F3.5, but the MCU 10 of the camera body need not conduct the calculations (7)–(9). In the present example the maximum aperture value $14 of the lens is changed to a value $2C by a simple addition of the equation (6) in response to the mounting of the teleconversion lens, and a usual exposure calculation utilizing the maximum aperture can be conducted thereafter. On the other hand, if the mounted teleconversion lens has a limited maximum aperture of F2, a value $18 is stored in the memory M(2, 1). Thus, according to the result of comparison in the step 160 in FIG. 4, the program proceeds to the step 161 for transferring the data $18 of the memory M(2, 1) to the memory M(1, 1) storing the maximum aperture value. Consequently the step 162 effects the addition of the value of the memory (1, 1) transferred to the memory M(2, 1) and the value of the memory M(2, 0) in the following manner:

$$\$18 + \$18 = \$30 \tag{10}$$

thus obtaining a synthesized maximum aperture F4 (cf. Tab. 2).

The timing chart shown in FIG. 3 shows a case in which the interchangeable lens 2 and the intermediate accessory 3 are both mounted on the camera body 1. However, if the interchangeable lens 2 alone is mounted, there are formed electrical connections 1a–2a 1b–2b, 1c–2c, 1d–2d and 1f–2f, but the contact 1e is not connected to any contact of the lens. As the result, the variable j is set at 2, and the sub-routine shown in FIG. 4 is initiated. The MCU 10 shifts the port P12 to the low level state at t=tl, but the response of the MCU 30

(downshift of the port P2 for shifting the port P12 to the low-level state) is not obtained at t=t2. Thus the port P12 is shifted at the high-level state at t=t2 to repeat the step 108. The subroutine shown in FIG. 5 is terminated upon expiration of the predetermined period T0.

After the step 157 shown in FIG. 4, the memory areas M(2, 0) and M(2, 1) of the MCU 10 store data $00 reset in the step 153, so that the process of the steps 159–162 does not affect the result.

When the intermediate accessory 4 shown in FIG. 2 is mounted on the camera body 1, there are formed electrical connections 1a–4a, 1c–4c, 1d–4d, 1e–4e and 1f–4f but the electrical contact 1b, connected to the port P11 of the MCU 10, remains unconnected. The serial data transfer between the camera body 1 and the intermediate accessory 4 is conducted in a similar manner as in the period t1–t10 shown in FIG. 3. At t=t1, the MCU 10 initiates the serial data transfer by shifting the port P12 to the low-level state, and the intermediate accessory 4 receives this output signal by the input/output port P4 of the MCU 40 and responds by shifting said port P4 to the low-level state at t=t2. In the following sequence, the input/output port P4 of the MCU 40 behaves according to the flow chart shown in FIG. 6, in the same manner as the input/output port P3 of the MCU 30. More specifically the port SO of the MCU 40 undergoes a change represented by the curve (10). Naturally the data transferred to the camera body 1 are dependent on the characteristics of each intermediate accessory.

In response to the address data $02 supplied from the camera body as shown in FIG. 3, the accessory 4 transmits data $18 to the camera body, in the same manner as the intermediate accessory 3. Then, for receiving the information on the lens 5, the MCU 10 of the camera body 1 sets the variable j at "1" and enters the sub-routine shown in FIG. 5. At t=t11, the input/output port P11 is shifted to the low-level state to request response from the lens 5, but the contact 1b is not connected. Thus, when the port P11 is shifted to the high-level state at t=t13, said port P11 remains at the high-level state since it is not shifted to the low-level state by the lens at t=t12. The serial data-input/output sub-routine (FIG. 5) is terminated after the predetermined period T0. When the interchangeable lens 2 is combined with the intermediate accessory 4 and mounted on the camera body 1, said lens 2 behaves like the lens 5 without electrical contacts since the contacts of said lens 2 are not connected with the camera body.

In the foregoing there have been explained data of the address $00 in the ROM's of the MCU's 20, 30 and 40, but data of other addresses are also processed in a similar manner.

As explained in the foregoing, the camera body can easily explain data not only from the lens but also from or through intermediate accessories of various forms. Also the data reading from the intermediate accessory and the lens are conducted in succession in the flow chart shown in FIG. 4, but such data reading operations may be conducted in an arbitrary order.

In case the intermediate accessory 4 is mounted on the camera body 1, the MCU 10 can identify the fact that the contacts of the lens are not connected, by sending address data $04 and obtaining the data of the accessory type stored in the address $04. It is therefore possible to dispense with the step of initiating the data readout from the interchangeable lens by the port P11 and to thereby shorten the process time.

Also if the lens data are variable by an encoder corresponding to the focal length, as in the case of a zoom lens, a value "1" can be stored in the bit $\phi$ of the address $04 indicating the lens type, thereby enabling the MCU 10 to identify such lens. In case a zoom lens with an encoder and an intermediate accessory without encoder are combined and mounted on the camera body 1, the necessary data can be read only once from said intermediate accessory but have to be read at least at a regular interval from the zoom lens, since the lens data may be varied at any time by said encoder. In such case, the data reading from the interchangeable lens 2 may be repeated after the data reading from the intermediate accessory 3. On the other hand, if the intermediate accessory is provided with an encoder, a value "1" can be set at the bit $\phi$ of the address $04 indicating the accessory type, thereby enabling the MCU 10 to identify such accessory. In such case, if the mounted lens is not equipped with an encoder, the data reading from the intermediate accessory alone may be repeated after the data reading from the lens.

What is claimed is:

1. A camera system comprising:

a camera body provided with calculating means for performing an exposure operation with respect to an exposure of a film, first memory means, a first start terminal and a second start terminal, said camera body generating a first start signal from said first start terminal and generating a second start signal from said second start terminal, said first memory means having an input terminal;

an image-taking lens mountable on said camera body and provided with an image-taking optical system and second memory means in which first data with respect to the optical characteristics of said image-taking optical system is stored, said second memory means generating a first data signal indicative of said first data in response to said first start signal; and c. an intermediate accessory mountable between said camera body and said image-taking lens and provided with an accessory optical system, third memory means, transfer means, an output terminal and connecting means, said transfer means transferring said first start signal from said first start terminal to said second memory means, and said output terminal electrically connecting with said input terminal when said intermediate accessory is mounted between said camera body and said image-taking lens, said connecting means causing said second memory means and said third memory means to be electrically connected with said output terminal when said image-taking lens is mounted on said intermediate accessory, second data with respect to the optical characteristics of said accessory optical system being stored in said third memory means, said third memory means generating a second data signal indicative of said second data in response to said second start signal from said second start terminal when said intermediate accessory is mounted on said camera body;

d. said first data signal and said second data signal being transferred by said connecting means to said first memory means; said first memory means storing said first data signal and said second data signal therein, said calculating means performing said exposure operation on the basis of said first and second data signals stored in said first memory means.

2. A camera according to claim 1, wherein said calculating means corrects said first data indicated by said first data signal on the basis of said second data indicated by said second data signal.

3. A camera according to claim 4, wherein said camera body controls the generation of said frist and second start signals so that said first start signal and said second start signals are generated respectively at different times.

4. A camera according to claim 3, wherein said camera body controls the generation of said first and second start signals so that said first start signal is generated after the generation of said second start signal and completion of the storing of said second data signal by said first memory means.

* * * * *